United States Patent
Ning et al.

(10) Patent No.: US 9,760,806 B1
(45) Date of Patent: Sep. 12, 2017

(54) METHOD AND SYSTEM FOR VISION-CENTRIC DEEP-LEARNING-BASED ROAD SITUATION ANALYSIS

(71) Applicant: TCL RESEARCH AMERICA INC., San Jose, CA (US)

(72) Inventors: Guanghan Ning, San Jose, CA (US); Haohong Wang, San Jose, CA (US); Wenqiang Bo, San Jose, CA (US); Xiaobo Ren, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 21 days.

(21) Appl. No.: 15/152,094

(22) Filed: May 11, 2016

(51) Int. Cl.
| | | |
|---|---|---|
| *G06K 9/00* | (2006.01) |
| *G06K 9/66* | (2006.01) |
| *G06T 7/00* | (2017.01) |
| *G06T 7/20* | (2017.01) |
| *B60W 50/14* | (2012.01) |

(52) U.S. Cl.
CPC ............... *G06K 9/66* (2013.01); *B60W 50/14* (2013.01); *G06K 9/00798* (2013.01); *G06K 9/00805* (2013.01); *G06K 9/00818* (2013.01); *G06K 9/00825* (2013.01); *G06T 7/0081* (2013.01); *G06T 7/2033* (2013.01); *G06T 7/2093* (2013.01); *B60W 2050/146* (2013.01); *G06T 2207/20081* (2013.01); *G06T 2207/30236* (2013.01); *G06T 2207/30241* (2013.01); *G06T 2207/30261* (2013.01)

(58) Field of Classification Search
CPC .. G06K 9/66; G06K 9/00805; G06K 9/00798; G06K 9/00818; G06K 9/00825; G06T 7/0081; G06T 7/2033; G06T 2207/30236; G06T 2207/30261; G06T 2207/30241; G06T 2207/20081; B60W 2050/146; B60W 50/14
USPC ................................. 382/103, 104, 106, 107
See application file for complete search history.

(56) References Cited

U.S. PATENT DOCUMENTS

| | | | | |
|---|---|---|---|---|
| 8,825,350 B1* | 9/2014 | Robinson | ............. | G08G 1/0116 340/909 |
| 2008/0040004 A1* | 2/2008 | Breed | ................. | B60R 21/0134 701/45 |
| 2011/0043377 A1* | 2/2011 | McGrath | ............ | G08G 1/09675 340/905 |
| 2015/0343947 A1* | 12/2015 | Bernico | ................... | B60Q 9/00 340/436 |

(Continued)

*Primary Examiner* — Tom Y Lu
(74) *Attorney, Agent, or Firm* — Anova Law Group, PLLC (57) ABSTRACT

In accordance with various embodiments of the disclosed subject matter, a method and a system for vision-centric deep-learning-based road situation analysis are provided. The method can include: receiving real-time traffic environment visual input from a camera; determining, using a ROLO engine, at least one initial region of interest from the real-time traffic environment visual input by using a CNN training method; verifying the at least one initial region of interest to determine if a detected object in the at least one initial region of interest is a candidate object to be tracked; using LSTMs to track the detected object based on the real-time traffic environment visual input, and predicting a future status of the detected object by using the CNN training method; and determining if a warning signal is to be presented to a driver of a vehicle based on the predicted future status of the detected object.

20 Claims, 6 Drawing Sheets

(56) References Cited

U.S. PATENT DOCUMENTS

2015/0347831 A1* 12/2015 Tamatsu ............. G06K 9/00369
                                                          382/156
2017/0178664 A1*  6/2017 Wingate ............. G10L 21/0308

* cited by examiner

METHOD AND SYSTEM FOR VISION-CENTRIC DEEP-LEARNING-BASED ROAD SITUATION ANALYSIS

FIELD OF THE DISCLOSURE

The present disclosure relates to the field of image processing technologies and, more particularly, relates to a method and system for vision-centric deep-learning-based road situation analysis.

BACKGROUND

In order to raise the quality of mobility, driver assistance systems (DAS) offer a means to enhance, among other things, active and integrated safety. Nowadays, the building of advanced driver assistance systems (ADAS) to support rather than replace human drivers has become a trend in current intelligent vehicle research. These systems support drivers by strengthening their sensing ability, warning in case of error, and reducing the controlling efforts of drivers.

An ADAS system usually uses more than one kind of sensor: image sensors, lidar, and radar, etc. No single sensor can provide input as complete, robust, and accurate. Image sensors have some problems, such as low ability of sensing depth and higher ability of discrimination than lidar and radar. Radar shows limited lateral spatial information because it is not available at all, the field of view is narrow, or the resolution is reduced at large distances. Although lidar has a wide view field that solves part of the previous problems, there are other problems such as low ability of discrimination, clustering error, and recognition latency. Ultrasonic sensors are used to detect obstacles in the surrounding environment, but they are usually complemented by rearview cameras to better assist the driver with more detailed information. These restrictions of the different sensor types explain the attention given to sensor fusion in research on object detection and tracking, as well as to the fuller exploitation of each sensor type.

The disclosed method and system for vision-centric deep-learning-based road situation analysis are directed to solve one or more problems set forth above and other problems.

BRIEF SUMMARY OF THE DISCLOSURE

In accordance with some embodiments of the disclosed subject matter, a method and a system for vision-centric deep-learning-based road situation analysis that gives timely navigation warning are provided.

One aspect of the present disclosure provides a method for vision-centric deep-learning-based road situation analysis, comprising: receiving real-time traffic environment visual input from at least one camera; determining, using a recurrent you only look once (ROLO) engine, at least one initial region of interest from the real-time traffic environment visual input by using a convolutional neural networks (CNN) training method; verifying, using the recurrent you only look once (ROLO) engine the at least one initial region of interest to determine if a detected object in the at least one initial region of interest is a candidate object to be tracked by using the CNN training method; in response to determining the detected object is a candidate object, tracking, using a plurality of long short-term memory units (LSTMs), the detected object based on the real-time traffic environment visual input, and predicting a future status of the detected object by using the CNN training method; and determining if a warning signal is to be presented to a driver of a vehicle based on the predicted future status of the detected object.

In some embodiments, tracking the detected object is based at least in partial on real-time signals of the detected object from a lidar sensor and an infrared sensor.

In some embodiments, the future status of the detected object is determined by calculating a distance between the detected object and the vehicle, a speed of the detected object, and a moving direction of the detected object.

In some embodiments, the candidate object to be tracked comprises: a road line, another vehicle near the vehicle, a pedestrian, an obstacle in front of the vehicle, and a traffic sign.

In some embodiments, the CNN training method comprises: a pre-training phase of convolutional layers for feature learning; a you only look once (YOLO) training phase for object detection; and a LSTM training phase for object tracking.

In some embodiments, the pre-training phase of convolutional layers comprises generating a feature cube of shape K×K×D to represent visual features of a plurality of detected objects.

In some embodiments, the YOLO training phase for object detection comprises translating the feature cube to a tensor representation.

In some embodiments, before the LSTM training phase, the feature cube is encoded into feature vectors.

In some embodiments, the LSTM training phase for object tracking is performed in together with a Kalman filter.

In some embodiments, the CNN training method comprises using a convolutional neural networks having a plurality of convolutional layers followed by two fully connected layers.

Another aspect of the present disclosure provides a system for vision-centric deep-learning-based road situation analysis, comprising: at least one camera for receiving real-time traffic environment visual input; a recurrent you only look once (ROLO) engine configured for: determining at least one initial region of interest from the real-time traffic environment visual input by using a convolutional neural networks (CNN) training method, and verifying the at least one initial region of interest to determine if a detected object in the at least one initial region of interest is a candidate object to be tracked by using the CNN training method; a plurality of long short-term memory units (LSTMs) configured for: in response to determining the detected object is a candidate object, tracking the detected object based on the real-time traffic environment visual input, and predicting a future status of the detected object by using the CNN training method; and a decision making agent for determining if a warning signal to be presented to a driver of a vehicle based on the predicted future status of the detected object.

In some embodiments, the system further comprises a sensor fusion configured for processing real-time signals of the detected object from a lidar sensor and an infrared sensor.

In some embodiments, the plurality of long short-term memory units (LSTMs) are further configured for calculating a distance between the detected object and the vehicle, a speed of the detected object, and a moving direction of the detected object.

In some embodiments, the system further comprises: a road line recognition module for determining if the detected object is a road line; a pedestrian detection module for determining if the detected object is a pedestrian; an obstacle detection module for determine if the detected object is an obstacle in front of the vehicle; and a traffic sign recognition module for determine if the detected object is a traffic sign.

In some embodiments, the recurrent you only look once (ROLO) engine comprises a convolutional neural networks (CNN) for generating a feature cube of shape K×K×D to represent visual features of a plurality of detected objects.

In some embodiments, the convolutional neural networks (CNN) is further configured for translating the feature cube to a tensor representation.

In some embodiments, the convolutional neural networks (CNN) is further configured for encoding the feature cube into feature vectors before a LSTM training phase.

In some embodiments, the plurality of long short-term memory units (LSTMs) are further configured for performing the LSTM training phase for object tracking in together with a Kalman filter.

In some embodiments, the convolutional neural networks (CNN) has a plurality of convolutional layers followed by two fully connected layers.

In some embodiments, the system further comprising a human-computer interface to present the warning signal to the driver of the vehicle.

Other aspects of the present disclosure can be understood by those skilled in the art in light of the description, the claims, and the drawings of the present disclosure.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to the drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

In accordance with various embodiments of the disclosed subject matter, a method and a system for vision-centric deep-learning-based road situation analysis are provided.

The disclosed system for vision-centric deep-learning-based road situation analysis, also called a vision-centric mobile advanced driver assistance systems (ADAS) system, can provide enhanced navigation via automatic environment understanding for assisting a driver to have a better road/vehicle situational awareness in complex traffic scenarios.

Figure 1:
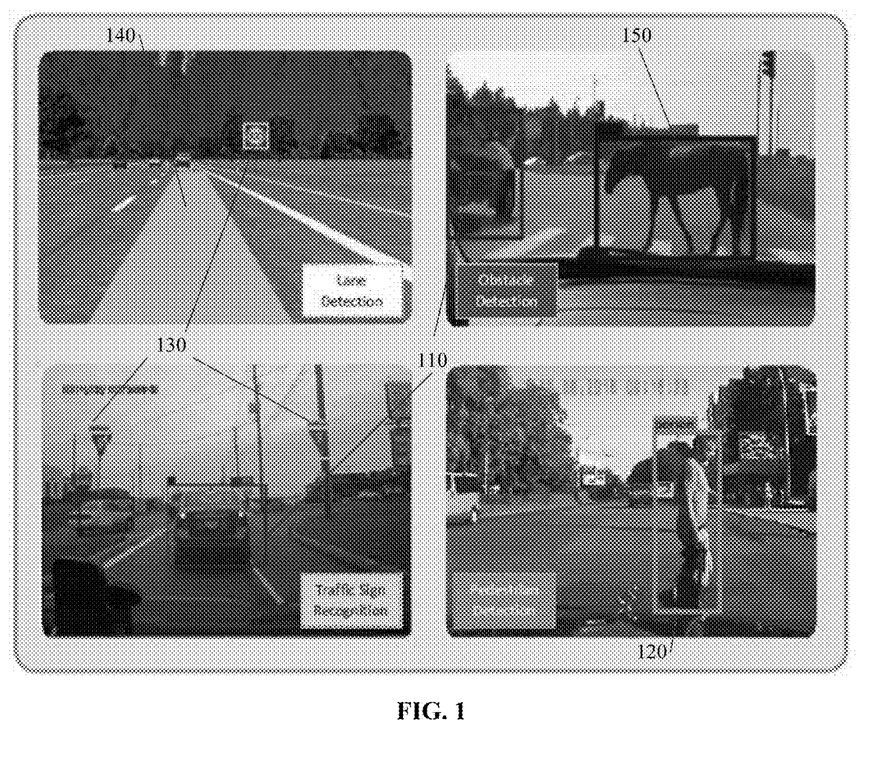
FIG. 1 illustrates exemplary navigation warning interfaces of a system for vision-centric deep-learning-based road situation analysis in accordance with some embodiments of the disclosed subject matter.

For example, referring to FIG. 1, an exemplary navigation warning interface of the system for vision-centric deep-learning-based road situation analysis is shown in accordance with some embodiments. As illustrated, the disclosed system can perform generic object recognition, fulfilling the specific tasks of: vehicle detection 110, pedestrian detection 120, traffic sign recognition 130, lane detection and departure warning 140, obstacle detection and forward collision prevention 150, etc.

In the system, a deep neural network called Recurrent YOLO (You Only Look Once) or ROLO is provided as a core engine of the system. Information about drivers, traffic environment, and vehicles provided by onboard sensors are processed, fused and analyzed by the ROLO engine. The network can utilize temporal-spatial information by contemplating a series of frames, and can predict obstacle information at the future time.

The term YOLO (You Only Look Once) used herein refers to an image recognition architecture for detecting different classes of objects. In a YOLO system, a neural network is used to recognize and detect a full image. The neural network divides the image into multiple regions and predicts bounding boxes and probabilities for each region. These bounding boxes are weighted by the predicted probabilities. The detections can be threshold by some value to only see high scoring detections.

In some embodiments, the Recurrent YOLO (ROLO) can connect the convolutional layers of YOLO to a recurrent neural network (RNN) long short-time memory (LSTM), for the purpose of real-time object detection and tracking.

Long short-term memory (LSTM) is one type of recurrent neural network (RNN) architecture. An LSTM network is universal in the sense that given enough network units it can compute anything a conventional computer can compute, provided it has the proper weight matrix, which may be viewed as its program.

An LSTM network is to learn from experience to classify, process and predict time series when there are very long time lags of unknown size between important events. A detailed description of the structure and the principle of LSTM incorporating with the disclosed subject matter is in the following in connection with FIGS. 5 and 6.

Unlike existing classifier-based methods, the disclosed network can perform object detection and recognition in a single network evaluation. As a powerful engine, the disclosed network is efficient yet accurate in generic object detection, fully exploiting and utilizing the visual cues provided by the camera sensor.

In some embodiments, a tracking approach is disclosed to improve the performance of the Kalman filter. Further, a verification step based on effective distance measurement is disclosed which specifically improves the performance for object detection on an ADAS system.

By aiding a driver in orientation, the disclosed system can hold the potential to reduce the driver's workload, allowing a greater amount of mental resources to be dedicated to the primary driving task, thereby reducing the risk of accidents due to inattention. Additionally, the disclosed system can help in saving gas/fuel by anticipatory driving and travelling to a destination via the optimal route. As is illustrated in FIG. 1, the disclosed system can keep supervising the road situation, shorten the time of the driver from inattention mode to attention mode by warning the driver of unnoticed situations, and also reduce the response time spent on contemporary stimuli among the driver's tasks.

Figure 2:
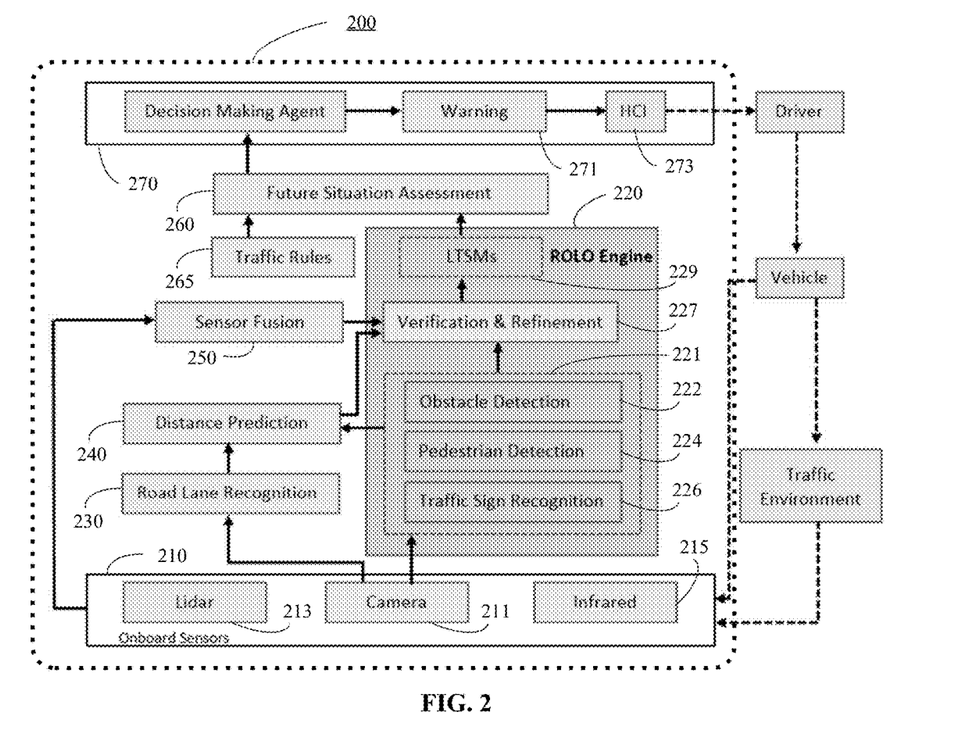
FIG. 2 illustrates a structure diagram of an exemplary system for vision-centric deep-learning-based road situation analysis in accordance with some embodiments of the disclosed subject matter.

Referring to FIG. 2, a structure diagram of an exemplary system 200 for vision-centric deep-learning-based road situation analysis is shown in accordance with some embodiments. In some embodiments, the system 200 for vision-centric deep-learning-based road situation analysis can be integrated in any suitable vehicle, such as a car, a SUV, a truck, a bus, a gasoline motor vehicle, a diesel motor vehicle, a hybrid car, an electric vehicle, etc. In some other embodiments, the system 200 for vision-centric deep-learning-based road situation analysis can be a separated system that can be amounted on any suitable vehicle.

As illustrated, the system 200 for vision-centric deep-learning-based road situation analysis can include onboard sensors 210, deep neural network ROLO engine 220, road lane recognition module 230, distance prediction module 240, sensor fusion module 250, future situation assessment module 260, fuzzy decision making agent 270, and any other suitable components.

In some embodiments, the onboard sensors 210 includes one or more cameras 211, one or more lidar sensors 213, one or more infrared sensors 215, and any other suitable sensors. The deep neural network ROLO engine 220 includes a deep convolutional neural network 221 which comprises obstacle detection module 222, pedestrian detection module 224, and traffic sign recognition module 226. The ROLO engine 220 further includes verification and refinement module 227, and multiple long short-time memory units (LSTMs) 229.

The visual cues captured by the one or more cameras 211 are used to detect road lanes, which is essential for accurate vehicle distance estimation. The visual information is also processed by the deep convolutional neural network 221, whose task is generic object localization and recognition including pedestrian detection, vehicle detection, and traffic sign recognition, etc. The raw data from other onboard sensors, such as one or more lidar sensors 213 and one or more infrared sensors 215, in conjunction with the distance prediction module 240, are fused to verify and refine the detected candidates. Based on the temporal-spatial evolving, the recurrent neural network LTSMs 229 generate a prediction distribution. The situation is assessed by the fuzzy decision making agent 270, who decides when and what warning 271 to give via the human-computer interface (HCI) 273.

For moving objects, robust and reliable detection and tracking is a challenging task under the conditions of variable size and distance, various weather and illumination, and cluttered background. For instance, detecting and tracking cut-in and overtaking vehicles in a dynamic background is an important task for avoiding a crash.

Figure 3:
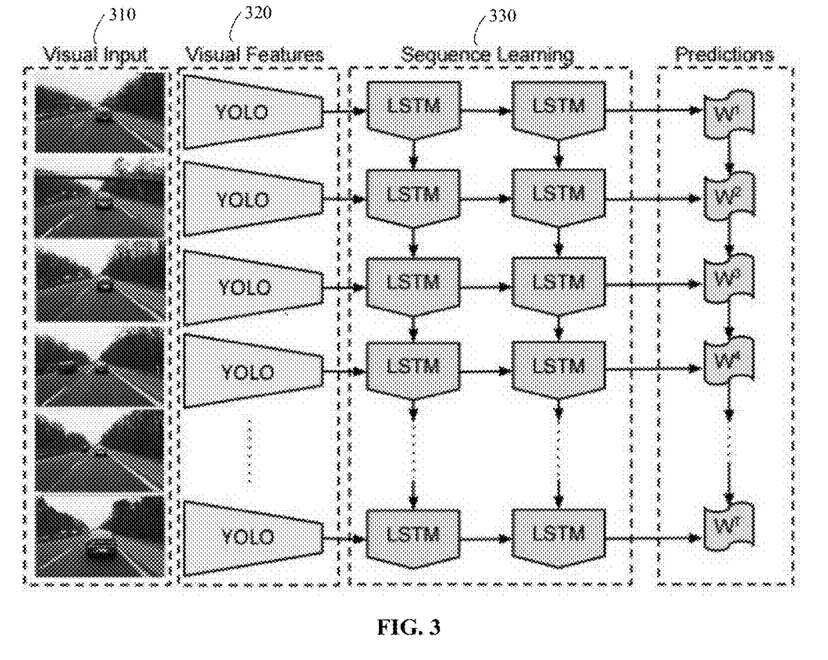
FIG. 3 illustrates a schematic diagram of an exemplary deep-learning neural network ROLO in accordance with some embodiments of the disclosed subject matter.
Figure 4:
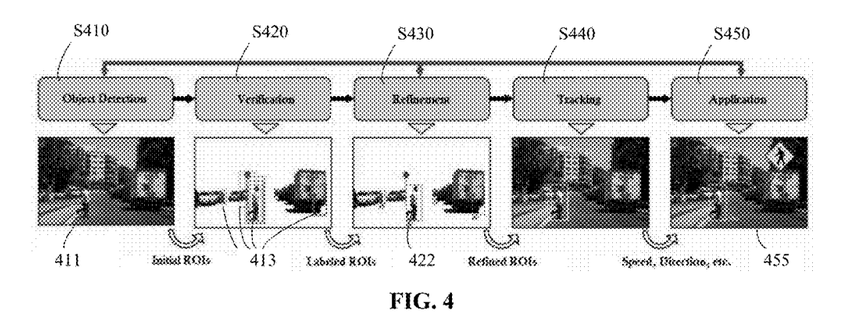
FIG. 4 illustrates a schematic diagram of an exemplary process for generic object recognition and tracking in accordance with some embodiments of the disclosed subject matter.

In system 200 for vision-centric deep-learning-based road situation analysis, the generic object recognition and tracking is mainly realized by the deep neural network ROLO engine 220, whose structure is shown in FIG. 3, and the process of which is illustrated in FIG. 4.

Based on the visual cues from the one or more cameras 211, a generic object detection and classification can be performed by the deep neural network ROLO engine 220. The procedure generates candidates for pedestrians, vehicles, traffic signs and other potential obstacles in real-time. Complemented by the distance information provided by the one or more lidar sensors 213, as well as the distance estimation from the road lane detection module 230, false detections of object candidates can be pruned.

The disclosed method for vision-centric deep-learning-based road situation analysis contains a step that verifies and refines the regions of interest (ROIs). The verification step can filter false positives, using a criteria that do not overlap with the classifier, while the refinement step performs a fine segmentation to provide an accurate distance estimation or to support the subsequent tracking module. The verification step and the refinement step can be performed by the verification and refinement module 227.

The disclosed system 200 uses a tracking module in the deep neural network ROLO engine 220, together with a Kalman filter to follow detected pedestrians/vehicles over time. This step has several purposes: avoiding false detections over time, predicting future positions, thus feeding the object recognition modules including obstacle detection module 222, pedestrian detection module 224, and traffic sign recognition module 226, with pre-candidates, and, at a higher level, making useful inferences about pedestrian or vehicle behavior (e.g., walking direction, or lane change intention).

Assisted by the multiple long short-time memory units (LSTMs) 229, and according to the traffic rules stored in a suitable memory, the future situation assessment module 260 can predict future positions of detected vehicles and pedestrians. In addition to Kalman tracking, the future situation assessment module 260 can predict the probability distribution of the detected object towards multiple possible directions, thus feeding the decision making agent 270 with additional information that is essential for the disclosed system 200 against potential danger.

Further, for each detected object, based on its category, a following task-specific post-processing step can be employed, in order to fulfill various tasks including pedestrian detection, traffic sign recognition, and obstacle detection, etc.

For example, as illustrated in FIG. 4, an exemplary process for object recognition and tracking performed by the system 200 for vision-centric deep-learning-based road situation analysis can include the following steps.

At S410, an object detection step can be performed to determine initial regions of interest (ROIs) in the real-time visual input from the one or more cameras 211. For example, multiple initial ROIs 413 can be determined from the original real-time visual input 411.

The real-time visual input from the one or more cameras 211 can be processed by using any suitable image processing technique. For example, the real-time visual input can be processed sequentially, in parallel, and/or in any other suitable manner (e.g., by decoding encoded frames, by generating gray-scale images based on the video frames, by dividing into bounding boxes, by performing object detection and/or recognition on the video frames, etc.)

In some implementations, initial regions of interest (ROIs) can be determined from the real-time visual input using any suitable object detection technique, such as template matching, image segmentation, edge detection, etc., or using any suitable object recognition technique, such as edge matching, greyscale matching, gradient matching, color matching, feature matching, etc.

Each initial region of interest (ROI) 413 is a portion of an image frame of the original real-time visual input 411 that may contain the image of a road line, another vehicle near the vehicle, a pedestrian, an obstacle in front of the vehicle, a traffic sign, etc. Multiple initial regions of interest (ROI) 413 can be obtained from one or more image frames of the original real-time visual input 411. In some embodiments, multiple initial regions of interest (ROI) 413 may overlay to each other.

As a specific example illustrated in FIG. 4, multiple initial regions of interest (ROIs) 413 can be identified in the multiple bounding boxes from the original real-time visual input 411.

At S420, a verification step can be performed to filter false objectives from the initial ROIs, and generate labeled ROIs with real objectives classified and labeled.

In some embodiments, each initial region of interest (ROI) 413 can be further process to identify a classification of a detected object in the initial ROI. For example, the classification can include pedestrians, traffic signs, obstacles in front of the vehicle, other vehicles, road lines, etc.

Additionally, each initial ROI can be associated with a confidence index indicating a confidence level of the detected object in the initial ROI. For example, the confidence index can be determined based on a calculated matching rate of the detected object in the initial ROI. As another example, as described in the following, the confidence index can be determined by the convolutional features using region-based Convolutional Neural Networks (CNN).

The initial regions of interest (ROIs) 413 that overlap with the preset classifier and has a confidence index over a preset threshold can be labeled. As a special example illustrated in FIG. 4, a labeled ROI 422 indicating a person crossing the street can be determined as a real objective, classified as a pedestrian, and then labeled.

At S430, a refinement step can be performed to determine distances between the labeled real objectives and the vehicle, and generate refined ROIs. Any suitable image processing technique and/or algorithm can be used to determine distances based on the real-time visual input. For example, region-based Convolutional Neural Networks (CNN) training method described in details below in connection with FIG. 7 can be used to generate refined ROIs. In some embodiments, sensor fusion module 250 can process the signals from the one or more lidar sensors 213 and the one or more infrared sensors 215, and generate auxiliary data to assist determining the distances.

At S440, the refined ROIs can be continuously tracked in real-time. For example, as illustrated in FIG. 3, one or more labeled real objectives can be tracked over time through the real-time visual input 310 from the one or more cameras 211. During the tracking process, future situation of the refined ROIs including speed, direction, etc., can be predicted.

In some embodiments, the tracking process is performed by multiple long short-term memory (LSTM) units. The principle of long short-term memory (LSTM) allows using the normalized low-level signals for dynamic classification as an alternative to compute statistical functions over time windows of fixed length before assigning classes via static classifiers such as Support Vector Machines (SVMs). However, this would not be possible with conventional recurrent neural networks (RNNs) since they cannot access long-range context due to the back-propagated error either inflating or decaying over time, which is called the vanishing gradient problem. By contrast, LSTM RNNs overcome this problem and are able to model a self-learned amount of context information. A detailed structure of a LSTM unit is described below in connection with FIG. 5, and an implementation of the LSTM RNNs architecture is described below in connection with FIG. 6.

At S450, based on the predicted future situation of the refined ROIs, the decision making agent 270 can determine if generate a warning to the driver of the vehicle. For example illustrated in FIG. 4, a pedestrian ahead warning sign 455 can be generated based on the predicted speed and direction of the person crossing the street, and be presented to the driver via the human-computer interface (HCI) 273. As another example, if a predicted future situation indicating a stop sign is approaching the vehicle at a constant speed, which may mean that the driver does not notice the stop sign and are not going to slowdown to make a full stop, a stop sign ahead warning signal can be generated and be presented to the driver via the human-computer interface (HCI) 273.

It should be noted that, the human-computer interface (HCI) 273 can be any suitable interface and the warning can take any suitable corresponding form, such as a warning voice from a speaker, a warning light from an LED, a warning image/cartoon presented on a screen, a waning pattern projected on the windshield of the vehicle, or any combination thereof, etc.

Figure 5:
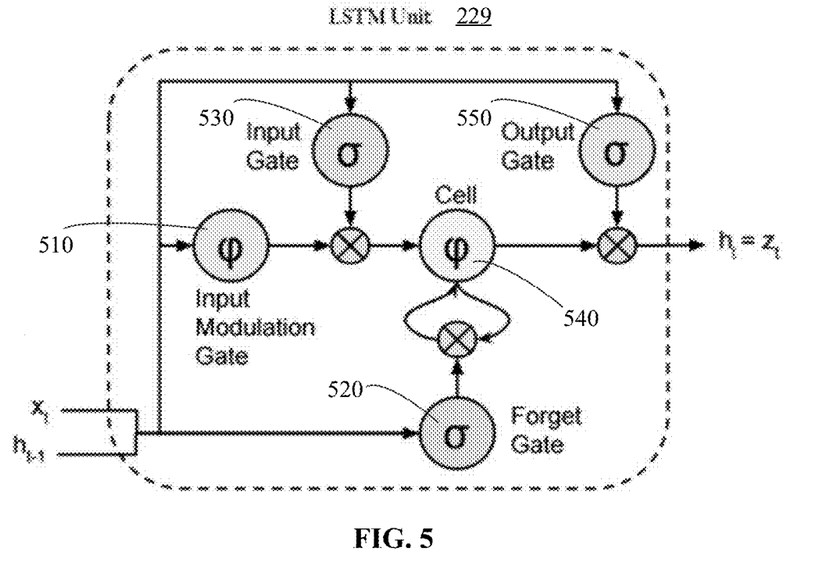
FIG. 5 illustrates a structure diagram of an exemplary long short-term memory (LSTM) unit in accordance with some embodiments of the disclosed subject matter.

In the disclosed system for vision-centric deep-learning-based road situation analysis, multiple long short-term memory (LSTM) units 229 are used. An exemplary structure diagram of an exemplary LSTM unit 229 is shown in FIG. 5 in accordance with some embodiments of the disclosed subject. As illustrated, the LSTM unit 229 includes input modulation gate 510, forget gate 520, input gate 530, cell 540, output gate 550, and any other suitable components.

Figure 6:
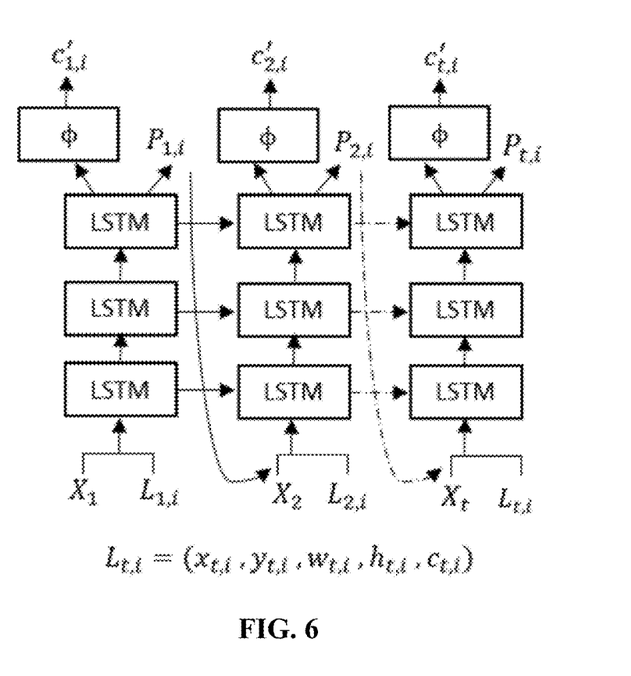
FIG. 6 illustrates a schematic diagram of an exemplary LSTM module of Recurrent You Only Look Once (ROLO) architecture in accordance with some embodiments of the disclosed subject matter.

Unlike standard RNNs, the LSTM architecture uses memory cells to store and output information, allowing it to better discover long-range temporal relations, as is illustrated in FIG. 6. Letting $\sigma=(1+e^{-x})^{-1}$ be the sigmoid non-linearity which squashes real-valued inputs to a [0, 1] range, and letting $$\phi(x) = \frac{e^x - e^x}{e^x + e^x},$$

the LSTM updates for timestamp t given inputs $x_t$, $h_{t-1}$, and $c_{t-1}$ are:

$$i_t = \sigma(W_{xi}x_t + W_{hi}h_{t-1} + b_i)$$

$$f_t = \sigma(W_{xf}x_t + W_{hf}h_{t-1} + b_f)$$

$$o_t = \sigma(W_{xo}x_t + W_{ho}h_{t-1} + b_o)$$

$$g_t = \sigma(W_{xc}x_t + W_{hc}h_{t-1} + b_c)$$

$$h_t = o_t \odot \phi(c_t)$$

Convolutional Neural Networks (CNN) achieve state-of-the-art performances on many of the image classification tasks, e.g., the ImageNet Large Scale Visual Recognition Challenge, the PASCAL visual object classes (VOC) challenge, etc. Region-based CNNs (R-CNN) are not only able to classify the image but to detect and recognize objects, which relies on an additional region proposal for economical inference, such as the selective search (SS) method. However, it is computationally expensive and therefore not appropriate for real-time applications. Each stage of its complex pipeline must be precisely tuned independently and the resulting system is very slow, taking more than 40 seconds per image at test time.

A deep CNN framework YOLO can achieve real-time performance (over 30 fps) on a Jetson TX1 mobile chip. YOLO shares some similarities with R-CNN, where each grid cell proposes a potential bounding boxes and scores those boxes using convolutional features. However, YOLO puts spatial constraints on the grid cell proposals which helps mitigate multiple detections of the same object. YOLO also proposes far fewer bounding boxes (e.g., only 98 per image compared to about 2000 from Selective Search), and combines these individual components into a single, jointly optimized model.

As illustrated in FIG. 3, there are three phases for the end-to-end training of the deep neural network ROLO model: the pre-training phase of convolutional layers for feature learning (not shown in the figure), the traditional YOLO training phase 320 for object detection, and the LSTM training phase 330 for object tracking. For each training phase, the learning rate of the existing layers from the previous phases is set as 0.

Figure 7:
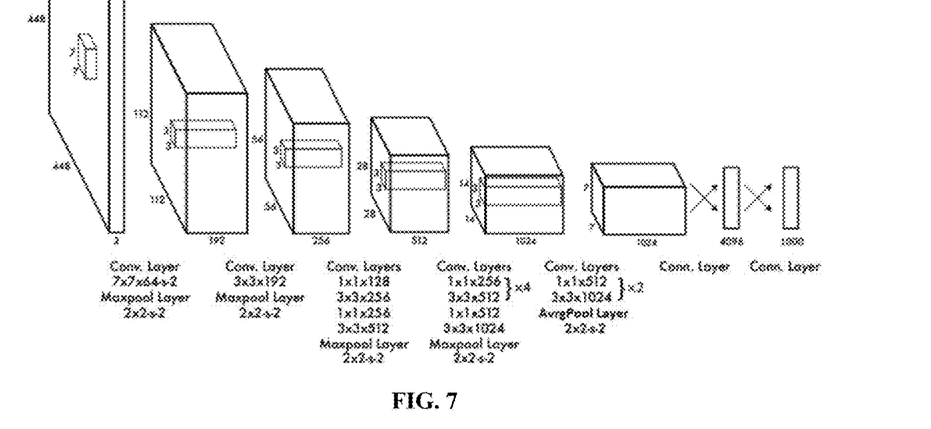
FIG. 7 illustrates a schematic diagram of an exemplary traditional CNN as a pre-training architecture is shown in accordance with some embodiments of the disclosed subject matter of the disclosed subject matter.

Referring to FIG. 7, a schematic diagram of an exemplary traditional CNN as a pre-training architecture is shown in accordance with some embodiments of the disclosed subject matter. The traditional CNN has 20 convolutional layers followed by 2 fully connected layers.

In the pre-training phase of convolutional layers for feature learning, the convolutional weights can be firstly pre-trained with a traditional CNN. The convolutional neural network takes the video frame as its visual input 310 and produce a feature map of the whole image. The last convolutional layer has D convolutional maps, and is a feature cube of shape K×K×D (such as 7×7×1024), which is the middle-level feature automatically learned with ImageNet data of 1000 classes during the pre-training phase. The convolutional weights are so learned that the network has a generalized understanding of almost arbitrary visual objects, given the large amounts of training data.

During pre-training phase, the output of the first fully connected layer is a feature vector of size 4096, a dense representation of the mid-level visual features. In theory, the feature vector can be fed into any classification tool, such as an SVM or a CNN to achieve good classification results with proper training.

Figure 8:
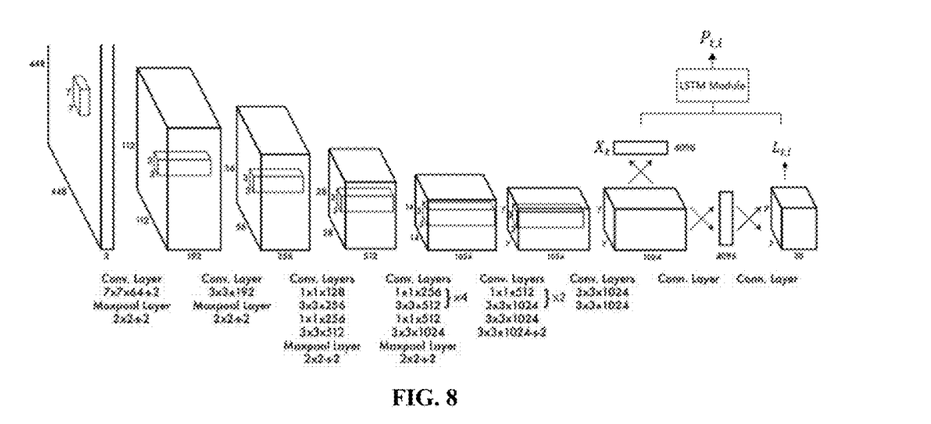
FIG. 8 illustrates a schematic diagram of an exemplary ROLO architecture in accordance with some embodiments of the disclosed subject matter.

Referring to FIG. 8, a schematic diagram of an exemplary ROLO architecture is shown in accordance with some embodiments of the disclosed subject matter.

Once the pre-trained convolutional weights being able to generate visual features, the YOLO architecture can be adopted as the detection part for the ROLO. In order to perform detection and tracking, the pre-training architecture can be converted by abandoning the average-pooling layer and the fully connected layer while keeping the convolutional layers.

It should be noted that, adding both convolutional and connected layers to pre-trained networks can improve performance. Therefore, four convolutional layers and two fully connected layers are added with randomly initialized weights.

Although the first fully connected layer is the same as that from the pre-training model, the weights are re-learned from the convolutional layers during training in order to interpret the visual cues to proper form before feeding into the following layers. In order to retain the visual cues, the $K^2$ D-dimensional vectors output by the last convolutional layer can be kept.

The second fully connected layer of YOLO, by contrast, translates the mid-level feature to tensor representations. These predictions are encoded as an S×S×(B×5+C) tensor. It denotes that the image is divided into S×S splits. Each split has B bounding boxes predicted, represented by its 5 location parameters including x, y, w, h, and its confidence c. A one-hot feature vector of length C is also predicted, indicating the class label each bounding box belongs to.

In one embodiment, the YOLO architecture can be followed and the variables can be set as S=7, B=2, C=20. The output of this fully connected layer, is the actual detection result of YOLO. The detections (x, y, w, h, c) at time t is denoted as $L_{t,i}$.

$$L_{t,i} = (x_{t,i}, y_{t,i}, w_{t,i}, h_{t,i}, c_{t,i})$$

At last, the LSTM RNNs can be added for the training of the tracking module. There are two streams of data flowing into the LSTMs, namely, the feature representations from the convolutional layers and the detection information $L_{t,i}$ from the fully connected layers.

Note that before feeding into the LSTM module, the $K^2$ D-dimensional vectors output by the last convolutional layer need to be forwarded into the first fully-connected layer learned by the pre-training model. It is because this fully-connected layer encodes the high-dimensional visual features into a single feature vector that is easier for LSTM to process.

The reason for not using the fully-connected layer from the YOLO model is that the weights from this layer is re-learned to interpret visual information to location information, therefore not proper for visual representation. Thus, at each time-step t, a one-dimensional vector of length 4096 can be extracted. These vectors are referred as $X_t$. In addition to the visual feature $X_t$ and the detection information $L_{t,i}$, another input to the LSTM is the output of itself from the last time-step t−1, i.e., the location prediction, denoted here as $P_{t-1,i}$.

In order to improve the performance, the detection information $L_{t,i}$ can be pruned when other complemented information is available. For example, the lane detection and distance estimation can be used to prune unlikely candidates. Based on the detection label, certain objects can be chosen to track instead of tracking all sorts of objects. However, the ROLO is described here as a generic object detection and tracking engine, assuming all of the detected candidates are fed into the LSTMs to track.

It should be noted that, the classification scheme in the disclosed method is performed the regions of interest (ROIs), rather than on the whole image. Also, the YOLO is directly used for detection while using LSTM as a tracking method. The multiple LSTMs are combined with the region-based neural network in the disclosed system for object detection and tracking.

Additionally, the disclosed training procedure is end-to-end, where the latter phase does not affect the performance of the previous phase. Therefore, the convolutional layers can be pre-trained for a robust feature representation, and then the YOLO model can be trained without worrying about the feature being ruined. Similarly, the existing network can be trained with LSTMs for a robust tracking module, with no worries about ruining either the feature representative.

Figure 9:
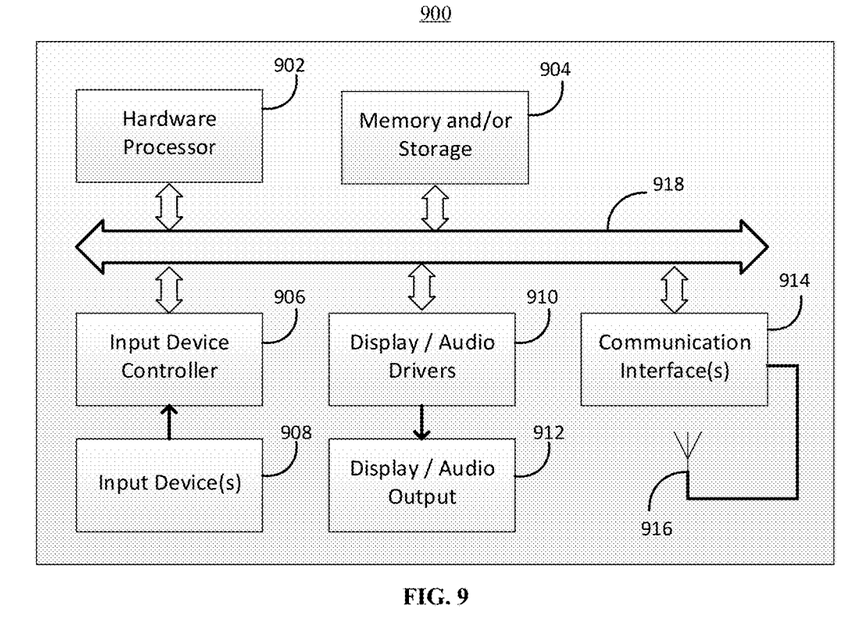
FIG. 9 illustrates a schematic hardware diagram of an exemplary system for vision-centric deep-learning-based road situation analysis in accordance with some other embodiments of the disclosed subject matter.

Referring to FIG. 9, a schematic diagram of an exemplary hardware of a system for vision-centric deep-learning-based road situation analysis is shown in accordance with some embodiments of the disclosed subject matter.

As illustrated, the hardware can include a hardware processor 902, memory and/or storage 904, an input device controller 906, one or more input devices 908, display/audio drivers 910, display and audio output circuitry 912, communication interface(s) 914, an antenna 916, and a bus 918.

Hardware processor 902 can include any suitable hardware processor, such as a microprocessor, a micro-controller, a central processing unit (CPU), a network processor (NP), a digital signal processor (DSP), an application specific integrated circuit (ASIC), a field-programmable gate array (FPGA), a micro-controller, digital signal processor, dedicated logic or other programmable logic device, discrete gate or transistor logic device, discrete hardware components for controlling the functioning of a general purpose computer or special purpose computer in some embodiments.

The hardware processor 902 can implement or execute various embodiments of the disclosed subject matter including one or more method, steps and logic diagrams. A general purpose processor may be a microprocessor or any other conventional processors. The steps of the disclosed method in various embodiments can be directly executed by a hardware decoding processor, or by a decoding processor combined by a hardware module and a software module. The software module may reside in any suitable storage/memory medium, such as memory and/or storage 904. The storage medium can be located in the memory and/or storage 904. Hardware processor 902 can implement the steps of the disclosed method by combining the hardware and the information read from the memory and/or storage 904.

Memory and/or storage 904 can be any suitable memory and/or storage for storing programs, data, media content, sensor raw data, image captured by camera, information of traffic rules, information of drivers, information of vehicles, and/or any other suitable content in some embodiments.

For example, memory and/or storage 904 can include multiple long short-term memory 229 (LSTMs) described above in connection with FIGS. 3 and 5. As another example, memory and/or storage 904 can include random access memory (RAM), read only memory, flash memory, non-volatile memory, such as hard disk storage, optical media, and/or any other suitable storage device.

Input device controller 906 can be any suitable circuitry for controlling and receiving various input, such as signal input, information input, and/or instruction input, etc., from one or more input devices 908 in some embodiments.

For example, as described above in connection with FIG. 2, input device controller 906 can include sensor fusion module 250 and input devices 908 can include multiple onboard sensors 210, such as one or more cameras 211, one or more lidar sensor 213, and one or more infrared sensors 215, etc.

As another example, input device controller 906 can be circuitry for receiving input from a touch screen, from one or more buttons, from a voice recognition circuit, from a microphone, from an accelerometer, from a temperature sensor, from a near field sensor, and/or any other suitable circuitry for receiving various input.

Display/audio drivers 910 can be any suitable circuitry for controlling and driving output to one or more display and audio output circuitries 912 in some embodiments. For example, display/audio drivers 910 can be circuitry for driving an LCD display, a speaker, an LED, and/or any other display/audio device.

Communication interface(s) 914 can be any suitable circuitry for interfacing with one or more communication networks, such as communication network 920 in some embodiments. For example, interface(s) 914 can include network interface card circuitry, wireless communication circuitry, and/or any other suitable circuitry for interfacing with one or more communication networks, such as Internet, wide area network, local network, metropolitan area networks, etc.

In some embodiments, communication network 920 can be any suitable combination of one or more wired and/or wireless networks such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a WiFi network, a WiMax network, a satellite network, a mobile phone network, a mobile data network, a cable network, a telephone network, a fiber optic network, and/or any other suitable communication network, or any combination of any of such networks.

Antenna 916 can be any suitable one or more antennas for wirelessly communicating with a communication network in some embodiments. In some embodiments, antenna 716 can be omitted when not needed.

Bus 918 can be any suitable mechanism for communicating between two or more of components 902, 904, 906, 910, and 914 in some embodiments. Bus 918 may be an ISA bus, a PCI bus, an EISA bus, or any other suitable bus. The bus 918 can be divided into an address bus, a data bus, a control bus, etc. The bus 918 is represented as a two-way arrow in FIG. 9, but it does not mean that it is only one type bus or only one bus.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, a method and a system for vision-centric deep-learning-based road situation analysis that gives timely navigation warning are provided in accordance with the disclosed subject matter. The automatic traffic environment understanding is realized by a deep learning engine ROLO. The disclosed method and system can perform a generic object recognition for lane recognition, vehicle detection, pedestrian detection, and traffic sign recognition, etc. Information about drivers, traffic environment, and vehicles are provided by onboard sensors, and are later processed, fused and analyzed by the deep neural network ROLO to perform real-time object detection and tracking. By contemplating a series of frames with LSTMs, where each frame is visually interpreted by convolutional layers, the network is able to utilize both temporal and spatial information efficiently.

Although the disclosed subject matter has been described and illustrated in the foregoing illustrative embodiments, it is understood that the present disclosure has been made only by way of example, and that numerous changes in the details of embodiment of the disclosed subject matter can be made without departing from the spirit and scope of the disclosed subject matter, which is only limited by the claims which follow. Features of the disclosed embodiments can be combined and rearranged in various ways. Without departing from the spirit and scope of the disclosed subject matter, modifications, equivalents, or improvements to the disclosed subject matter are understandable to those skilled in the art and are intended to be encompassed within the scope of the present disclosure.

What is claimed is:

1. A method for vision-centric deep-learning-based road situation analysis, comprising:
   receiving real-time traffic environment visual input from at least one camera;
   determining, using a recurrent you only look once (ROLO) engine, at least one initial region of interest from the real-time traffic environment visual input by using a convolutional neural networks (CNN) training method;
   verifying, using the recurrent you only look once (ROLO) engine, the at least one initial region of interest to determine if a detected object in the at least one initial region of interest is a candidate object to be tracked by using the CNN training method;
   in response to determining the detected object is a candidate object, tracking, using a plurality of long short-term memory units (LSTMs), the detected object based on the real-time traffic environment visual input, and predicting a future status of the detected object by using the CNN training method; and
   determining if a warning signal is to be presented to a driver of a vehicle based on the predicted future status of the detected object.

2. The method of claim 1, wherein tracking the detected object further comprises:
   tracking the detected object based at least in partial on real-time signals of the detected object from a lidar sensor and an infrared sensor.

3. The method of claim 1, wherein the future status of the detected object is determined by calculating a distance between the detected object and the vehicle, a speed of the detected object, and a moving direction of the detected object.

4. The method of claim 1, wherein the candidate object to be tracked comprises:
   a road line, another vehicle near the vehicle, a pedestrian, an obstacle in front of the vehicle, and a traffic sign.

5. The method of claim 1, wherein the CNN training method comprises:
   a pre-training phase of convolutional layers for feature learning;
   a you only look once (YOLO) training phase for object detection; and
   a LSTM training phase for object tracking.

6. The method of claim 5, wherein the pre-training phase of convolutional layers comprises generating a feature cube to represent visual features of a plurality of detected objects.

7. The method of claim 6, wherein the YOLO training phase for object detection comprises translating the feature cube to a tensor representation.

8. The method of claim 5, before the LSTM training phase, further comprising:
   encoding the feature cube into feature vectors.

9. The method of claim 5, wherein the LSTM training phase for object tracking is performed in together with a Kalman filter.

10. The method of claim 1, wherein the CNN training method comprises using a convolutional neural networks having a plurality of convolutional layers followed by two fully connected layers.

11. A system for vision-centric deep-learning-based road situation analysis, comprising:
    at least one camera for receiving real-time traffic environment visual input;
    a recurrent you only look once (ROLO) engine configured for:
       determining at least one initial region of interest from the real-time traffic environment visual input by using a convolutional neural networks (CNN) training method, and
       verifying the at least one initial region of interest to determine if a detected object in the at least one initial region of interest is a candidate object to be tracked by using the CNN training method;
    a plurality of long short-term memory units (LSTMs) configured for:
       in response to determining the detected object is a candidate object, tracking the detected object based on the real-time traffic environment visual input, and
       predicting a future status of the detected object by using the CNN training method; and
    a decision making agent for determining if a warning signal to be presented to a driver of a vehicle based on the predicted future status of the detected object.

12. The system of claim 11, further comprising:
    a sensor fusion configured for processing real-time signals of the detected object from a lidar sensor and an infrared sensor.

13. The system of claim 11, wherein the plurality of long short-term memory units (LSTMs) are further configured for calculating a distance between the detected object and the vehicle, a speed of the detected object, and a moving direction of the detected object.

14. The system of claim 11, further comprising:
    a road line recognition module for determining if the detected object is a road line;
    a pedestrian detection module for determining if the detected object is a pedestrian;
    an obstacle detection module for determine if the detected object is an obstacle in front of the vehicle; and
    a traffic sign recognition module for determine if the detected object is a traffic sign.

15. The system of claim 11, wherein the recurrent you only look once (ROLO) engine comprises a convolutional neural networks (CNN) for generating a feature cube to represent visual features of a plurality of detected objects.

16. The system of claim 15, wherein the convolutional neural networks (CNN) is further configured for translating the feature cube to a tensor representation.

17. The system of claim 15, wherein the convolutional neural networks (CNN) is further configured for encoding the feature cube into feature vectors before a LSTM training phase.

18. The system of claim 17, wherein the plurality of long short-term memory units (LSTMs) are further configured for performing the LSTM training phase for object tracking in together with a Kalman filter.

19. The system of claim 15, wherein the convolutional neural networks (CNN) has a plurality of convolutional layers followed by two fully connected layers.

20. The system of claim 11, further comprising a human-computer interface to present the warning signal to the driver of the vehicle.

* * * * *